United States Patent [19]
Nicoll

[11] 4,311,658
[45] Jan. 19, 1982

[54] MANUFACTURE OF CONTINUOUS PLASTIC SHEETS

[75] Inventor: Frank D. Nicoll, Edison, N.J.

[73] Assignee: Tenneco Chemicals, Inc., Saddle Brook, N.J.

[21] Appl. No.: 145,910

[22] Filed: May 2, 1980

[51] Int. Cl.[3] .................... B29D 7/14
[52] U.S. Cl. .................... 264/175; 264/210.1; 264/284; 264/331.15; 425/224; 425/363; 425/377; 425/DIG. 235
[58] Field of Search .................... 264/175, 76, 284, 216, 264/212, 210.1, 331.15; 425/363, DIG. 235, 224, 377

[56] References Cited

U.S. PATENT DOCUMENTS

| | | | |
|---|---|---|---|
| 806,625 | 12/1905 | Beecher | 264/175 |
| 1,590,638 | 6/1926 | Marquette | 264/175 |
| 2,317,447 | 4/1943 | Domizi | 264/175 |
| 2,442,876 | 6/1948 | Pearson | 264/212 |
| 3,074,114 | 1/1963 | Petry | 264/284 |
| 3,346,913 | 10/1967 | Lake et al. | 425/DIG. 235 |
| 3,876,737 | 4/1975 | Herner et al. | 264/175 |
| 4,014,636 | 3/1977 | Pawelczyk | 425/363 |
| 4,038,012 | 7/1977 | Sander | 425/363 |

*Primary Examiner*—Jeffery R. Thurlow
*Attorney, Agent, or Firm*—James P. Scullin

[57] ABSTRACT

In the manufacture of continuous sheets or films of plastic material, especially by calendering, an improved stripping process and apparatus are disclosed whereby the degree of residual strain in such sheets and films can be controlled and production rates increased. In preferred embodiments of the process and apparatus, sheets and films of substantially uniform side-to-side texture are obtained.

13 Claims, 10 Drawing Figures

11a
12
13
12a
S
15
10a
F
10
11

F
10
11
10a

12
S
11a
12a
15
15a
13

F
10
11
S
13
10a
13a
12
14

11a 10
11
F
10a
11a
12
13
12a
13a
S
S
12
13
12a
13a

S
13a
12a
13
12
15
11a
11
F
10
10a
14
13
12
13a
12a
S

MANUFACTURE OF CONTINUOUS PLASTIC SHEETS

FIELD OF THE INVENTION

This invention relates to the art of manufacturing films and sheets, especially thermoplastic films and sheets such as, but not limited to, those based on polyvinyl chloride. In its most preferred embodiment, the invention relates to the art of calendering. By means of the novel method and apparatus herein disclosed, a higher rate of production of calendered films and sheets having lower residual strains is obtained. In one embodiment of the invention sheets or films are improved with respect to surface uniformity, i.e., both sides of the sheets are essentially equal in smoothness.

DESCRIPTION OF THE PRIOR ART

Calendering is a continuous process by which raw materials such as thermoplastics are fluxed into a rubber-like mass and then passed through a series of nips formed by a number of heated cooperating rolls to form a film, sheet, or web of specified width and thickness. The sheet may be either polished or matte, depending on the finish of the final two calender rolls. When cooled to room temperature, the sheet may be flexible, semi-rigid, or rigid, the degree of flexibility or rigidity being controlled by the chemical structure or molecular weight of the polymer or plastic employed, and by the amount and type of any plasticizers or fillers which may be included in the composition.

In many applications it is desirable to provide calendered sheets having a low degree of residual strain, whereas for other applications it is necessary to have a higher degree of strain or orientation. In the latter case, it is important that the amount of strain imparted be capable of being controlled. Too much, or uncontrolled, strain can lead to problems such as distortion or excess shrinkage of the calendered sheet in its ultimate end use. Using the previously known and conventional calendering methods and apparatus, it has been found necessary to resort to various undesirable practices in order to meet specifications calling for calendered sheet having low strain. Most of such practices involve the lowering of production rates, which of itself is highly undesirable.

In certain applications for calendered sheets it is desirable that at least one of the surfaces of the sheet have a matte or textured finish so that a decorative pattern, or lettering, or both can be applied to the surface in a subsequent printing step. A matte finish materially assists the flow of the printing ink on the surface of the sheet, and also improves the adhesion of the ink to the sheet surface. To produce such a finish to the sheet it is necessary that one or both of the final calender rolls be matted by some suitable sand-blasting technique. This, of course, restricts the utility of the calender, and to revert it to the making of polished sheet necessitates the changing of the final calender rolls. Calenders have been constructed in which the first two rolls are polished and the second two are matted, so that depending on the rotational direction of the rolls it is possible to make both polished sheet and matte sheet on the same calender without necessity for downtime in order to change rolls. It is a requirement for certain especially critical printing operations that the matte finish on both sides of the sheet be identical, a condition that is very difficult or impossible to attain using conventional calendering methods and apparatus. In some cases, resort has been made to post-calendering treatment of the sheet in order to achieve it.

The control of strain, and to some degree the control of the identical nature of the matte surfaces, of the calendered sheet or film is a function of the stripper rolls. These are the rolls which take the sheet or film away from the final calender roll, and their construction, alignment, speed, and temperature control are critical. Reference to the drawings will give indication of some of the variations of stripper roll alignments relative to the final calender roll, together with some of the variations in calender roll alignments.

These stripper rolls are generally made of metal, and can vary in size from about 3 inches up to 10 inches or more in diameter. The surface of the stripper rolls can be polished or matte, and can be acid-etched, metal sprayed, chrome plated, Teflon® sprayed, or covered with paper, fabric, or other suitable material. They are driven, and are generally capable of running at speeds ranging from even speed with the final calender roll up to about four times calender speed (speed in this case referring to peripheral or linear speed, and not to rotational speed).

From the stripper roll, or final stripper roll if more than one is used, the sheet or film continues through the remaining components of the calendering train, which may comprise embosser, cooling cans, festoon, and slitter to a receiving station such as a windup unit (for flexible sheets or films) or cutting and stacking means (for highly rigid sheets) as is well known to those skilled in the art.

In the early development of the art of calendering the original stripper roll was in reality a doffing roll, having a diameter of up to 24 inches, which made only minimal, or "kissing" contact with the calendered sheet. The use of such a doffing roll was largely unsuccessful and it has been almost invariably supplanted in modern conventional calendering art with an arrangement wherein the stripper roll (or the one in closest proximity to the final calender roll when two or more are used) is rotated in a direction opposite to the direction of rotation of the calender roll from which the sheet is being stripped. In such an arrangement, the surface of the sheet which was not in contact with the surface of the calender roll from which it is stripped (referred to herein as the air side) comes into contact with the surface of the first stripper roll, and the surface of the sheet which was in contact with the calender roll surface (referred to herein as the roll side) contacts the surface of the second stripper roll, when more than one stripper roll is used. A study of the accompanying drawings will make this evident. The conventional stripper roll, or first stripper roll, is generally located in close proximity to the calender roll, sometimes as close as ½ inch away.

With this conventional method of stripping there are frequently problems with the release of the material from the final calender roll, depending on the newness of the matting with matte calender rolls and on the temperature of the final roll in the case of polished calender rolls. With the conventional method, the sheet or film tends to release more easily from the edges of the calender roll than from the center, resulting in uneven strain and uneven gauge in the sheet or film. This uneven stripping from the calender roll causes the sheet or film to have a tendency to overdrive the stripper rolls, with the introduction of increased, and largely uncontrollable, strain. This is markedly the case at higher rates of speed and of stretch of the sheet.

Depending on the configuration of the calender, the distance the sheet travels on the final calender roll varies. Typically, with an inverted "L" type calender the sheet travels on the final roll for about three-quarters of the circumference prior to stripping, and this results in a lack of surface-to-surface uniformity of finish of the sheet, even though both of the last two calender rolls have an equally matte finish. The surface in contact with the last calender roll (roll side) has a very definite matte or well-embossed appearance, while the reverse surface (air side) has a much less matte, more smooth, finish and appearance. This causes difficulty in printing on both sides of the sheet. The printer requires identical surfaces side-to-side, for uniformity of print application. With such a non-uniform sheet, printing on the roll side is dark and sharp while on the air side it is much fainter and less sharp.

The foregoing description of the prior art apparatus and method, and of their deficiency in the production of calendered sheet having an acceptable degree of strain and roll side/air side surface uniformity, holds true irrespective of the number of calender rolls or of the configuration of the rolls. Thus, any of the known calenders can be used in the prior art method, including 2-roll, 3-roll, 4-roll or 5 roll types, which can be arranged for example in 2-roll vertical, 2-roll inclined, 2-roll horizontal, 3-roll vertical, 3-roll 120°, 3-roll inverted "L", 3-roll triangular, 4-roll stack, 4-roll "L", 4-roll inverted "L", 4-roll flat "Z", 4-roll inclined "Z", 4-roll vertical "Z", or 5-roll "L" configurations. For the processing of thermoplastics, particularly rigid PVC, the most commonly used calenders are the 4- or 5-roll "L" or inverted "L" types, or the 4-roll inclined "Z" type (also known as an "S" calender).

Other known means for the manufacture of unsupported film and sheet include casting and extrusion. Casting can be used for making flexible film and sheet, as exemplified by casting a PVC plastisol on an endless metal belt, applying heat to fuse the plastisol into a film, and then stripping the film from the belt, cooling it, and winding it up in a similar fashion as is done in calendering. Flexible and rigid sheet and film can also be produced by extruding thermoplastic or other compositions through a flat die, and then cooling and winding it up using a series of rolls similar to those in a calendering train.

GENERAL DESCRIPTION OF THE INVENTION

The object of this invention is to provide an improved method and apparatus for the manufacture of films and sheets, especially thermosplastic films and sheets, having extremely good physical properties and a controlled degree of residual strain. In a particularly preferred embodiment of the invention, the method and apparatus are applied to the art of calendering, whereby films and sheets having the additional advantage of greatly improved roll side/air side surface uniformity are obtained. Under certain circumstances, the improved films and sheets can be obtained at higher production rates than heretofor attainable.

Although it will be understood that the method and apparatus of the invention can be applied to the manufacture of films and sheets by other techniques including casting and extrusion, they are particularly suitable for use with a calender, and will be explained in detail and exemplified as applied to the calendering art.

In the case of calendering it has now been found that the object can be achieved through the use of one or more driven stripper rolls which rotate in the same direction as the calender roll from which the sheet or film is being stripped. In other words, the stripper roll or rolls is or are driven in a clockwise direction when the calender rolls is being driven in a clockwise direction, and in a counter-clockwise direction when the calender roll is being driven counter-clockwise, both rolls being viewed from the same end. The stripper roll contacts the surface of the calendered sheet which was in contact with the surface of the calender roll from which it is being stripped, i.e. the "roll side" and not the "air side". Thus the method according to the present invention differs in two important respects from the prior art method: the rotational direction of the stripper roll relative to the rotational direction of the calender roll, and the sheet surface which the first stripper roll contacts.

Although one stripper roll according to the invention can be used, it is generally preferable to use two or more. The second and succeeding stripper rolls, when used, must rotate in the same direction as the first and must contact the same side of the calendered sheet or film.

Once the sheet or film has traversed the driven stripper roll or rolls according to the invention, it may, if desired, be fed over a conventional stripper roll or rolls in the conventional manner, such as through an "S" configuration of three rolls.

When it is desired to make a calendered sheet having a matte finish of substantially equal roughness on each surface a preferred embodiment of this invention can be used, wherein the first driven stripper roll is positioned close to the nip of the last two rolls of the calender. In this way, there is minimum contact between the sheet and the calender roll surface after the sheet has passed through the last nip. In a most preferred embodiment, the sheet is stripped from the calender roll along a line lying parallel to the nip and at a distance from the nip no greater than about ⅛ of the calender roll circumference. In other words, when viewing a side elevation of the calender roll, the point at which the sheet is stripped from the roll lies within the first half-quadrant from the final nip.

The method of this invention, and the driven stripper rolls as described, can be used with any calender irrespective of the number of calender rolls and irrespective of the configuration of the rolls.

BRIEF DESCRIPTION OF THE DRAWINGS

The accompanying drawings are diagrammatic side elevations of calender and associated stripper roll assemblies, in accordance with the prior art and in accordance with the present invention, illustrating some of the unlimited number of configurations and combinations possible. It will be understood that those drawings which depict, in schematic form, apparatus according to this invention are intended only to be illustrative thereof and not limitative thereof.

Figure 1:
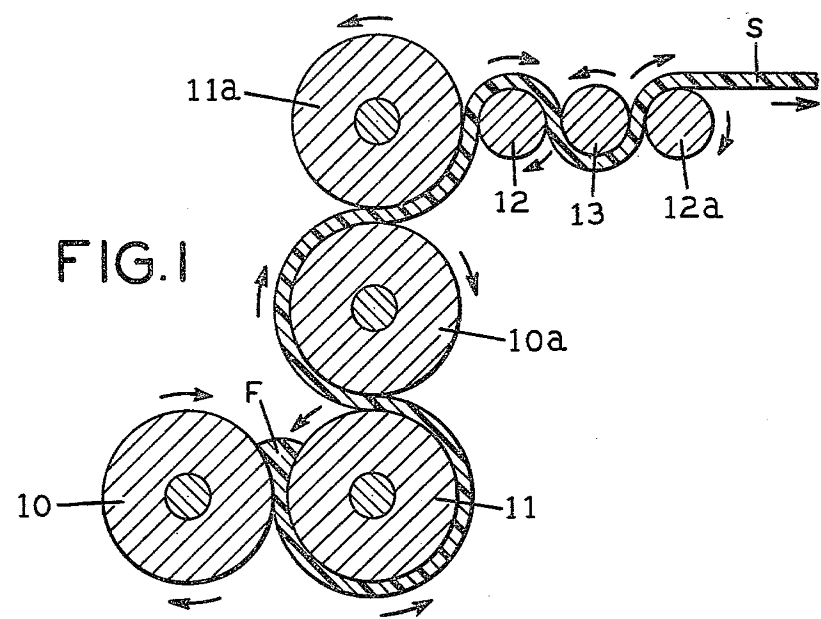
FIG. 1 represents a bottom-fed "L" calender, with three stripper rolls according to the prior art.

In each of the drawings, F represents the plastic material fed to the first nip of the calender, S represents the plastic sheet or film being calendered, 10 and 10a represent calender rolls driven in a clockwise direction, 11 and 11a represent calender rolls driven in a counter-clockwise direction, 12 and 12a represent stripper rolls according to the prior art driven in a clockwise direction, 13 and 13a represent stripper rolls according to the prior art driven in a counter-clockwise direction, 14 represents a stripper roll according to the present invention driven in a clockwise direction, and 15 and 15a represent stripper rolls according to the present invention driven in a counter-clockwise direction. Any difference in diameter between the prior art stripper rolls and the stripper rolls according to the invention as depicted in these diagrammatic drawings is without significance. The stripper rolls according to this invention can have diameters smaller than, equal to, or larger than those of conventional stripper rolls. Where they are shown smaller in the drawings it is only for purposes of clarity.

DETAILED DESCRIPTION OF THE INVENTION

Although the method and apparatus of this invention are particularly useful in calendering polyvinyl chloride (PVC), and its use will be exemplified in connection therewith, the scope of the invention is not limited thereto and embraces the calendering of any material which is capable of being calendered, including such thermoplastic materials as ABS, cellulose acetate, cellulose butyrate, cellulose propionate, ethylene/ethyl acrylate copolymers, alloys of PVC and acrylate ester polymers, polyolefins, and so forth. As used herein, the term "PVC" includes vinyl chloride homopolymers, copolymers and terpolymers, both plasticized and unplasticized, and compounds thereof containing any of the conventional additives such as impact modifiers, stabilizers, lubricants, fillers, colorants, and so on. In its broadest scope, the invention is also applicable to the manufacture of unsupported film and sheet from polymers that are normally cured, vulcanized, or thermoset such as natural rubber and the various synthetic rubbers and rubber substitutes, including halogen-containing polymers.

Among the benefits provided by this invention is that is enables the control of strain at higher calender speeds with higher degrees of stretch of the calendered sheet on the stripper rolls than has been possible with prior art stripping techniques wherein the first stripper roll runs in a contradirection to that of the calender roll from which the sheet is being stripped. This is particularly so with newly-matted and highly-matted calender rolls, and with polished calender rolls used to produce glass-clear films with low amounts of lubricant where release from the final calender roll is difficult. Especially at higher degrees of stretch, and especially with larger diameter stripper rolls, the prior art stripping techniques fail to meet the requirements of an ideal stripping system. Such an ideal system is one which is capable of running at speeds ranging from even speed with the calender to four times calender speed, or higher, and while running at any speed within the range but especially at the high end of the range will not cause the sheet or film to overdrive the stripper rolls despite the fact that subsequent drives in the calendering train are running at speeds in excess of stripper roll speed. In addition, with an ideal stripping system the sheet or film will not neck-in at high degrees of stretch. The stripping system of this invention substantially meets the requirements of such an ideal system.

The physical form and size of the stripper rolls used in the practice of this invention do not differ in any significant manner from conventional stripper rolls. Thus they will generally be made of a ferrous metal, and may advantageously be chrome plated. The surface can be smooth or matte, can be sand blasted, chemically etched, metal sprayed, Teflon ® coated, and so on, in known manner. In the case of plasticized PVC it is sometimes advantageous to cover the stripper rolls with a felt or a textile fabric. The material of construction of the stripper roll and the surface treatment thereof is not a part of the invention. The diameter of the stripper rolls is not critical. A diameter in the range of from about 4 inches to about 10 inches is generally satisfactory, but smaller or greater diameters can be used if desired without departing from the scope of the invention. As will be obvious to those skilled in the art, the width of the stripper rolls will be determined by the width of the calender with which they are to be used.

The stripper rolls of this invention are driven in the same rotational direction as the calender roll from which the sheet is being removed. They are driven by conventional means used in the calender art, such means having provision for varying and accurately controlling the rotational speed relative to, and independent of, the final calender roll speed and the speed of subsequent drives in the calendering train. The stripper rolls will have a speed range relative to that of the last calender roll of from even up to four times calender roll speed, or higher.

When it is desired to not stretch the sheet and to impart little or no residual strain, the rotational speed of the stripper roll or rolls will be such that the linear speed of the sheet as it passes the stripper roll or rolls is the same as its linear speed on the final calender roll. The subsequent drives in the train will maintain the same linear speed so that the original sheet thickness will be maintained, and little or no strain will be induced.

When it is desired to stretch the sheet in order to decrease its thickness without causing neck-in or imparting strain, the stripper roll speed is increased relative to the calender roll speed so that stretching occurs while the sheet is hot enough to still be in a thermoplastic, as opposed to thermoelastic, state.

If it is desired to deliberately impart a controlled degree of stress or orientation to the sheet, irregardless of whether or not is has been stretched, this can be done readily by increasing the speed of the drives subsequent to the stripper rolls, relative to the stripper roll speed. In order to accomplish this without further stretching, the sheet will have been cooled somewhat immmediately after leaving the stripper rolls so that it is in a thermoelastic state.

Satisfactory results have been obtained with stripper rolls not having any provision for temperature control, but it is advantageous to use rolls which have internal means for being heated and cooled in order to exercise precise control of the surface temperature of the rolls.

Figure 5:
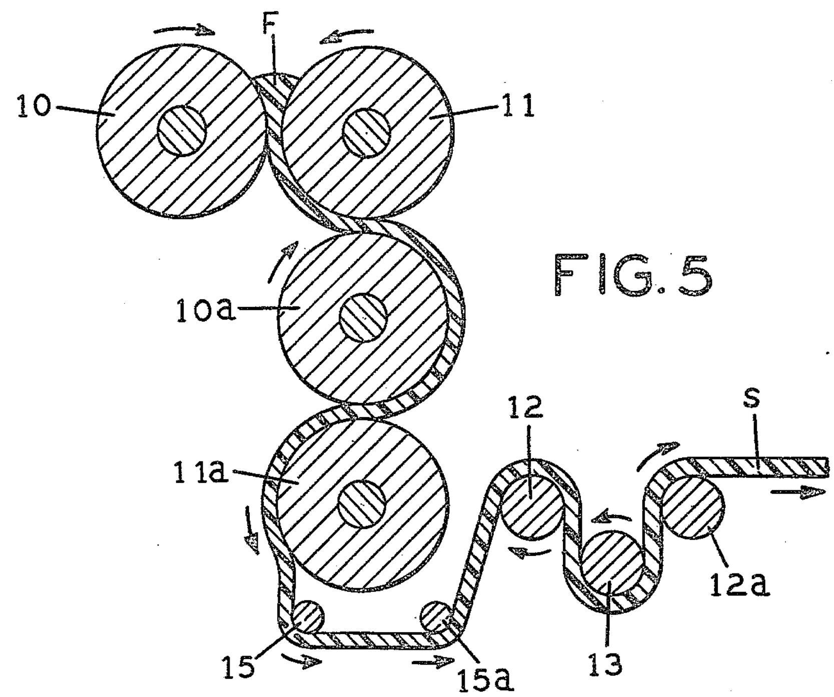
FIG. 5 represents a top-fed inverted "L" calender, with two stripper rolls according to the invention and with the three prior art stripper rolls shown in FIG. 2 serving as auxiliary take-off rolls.
Figure 10:
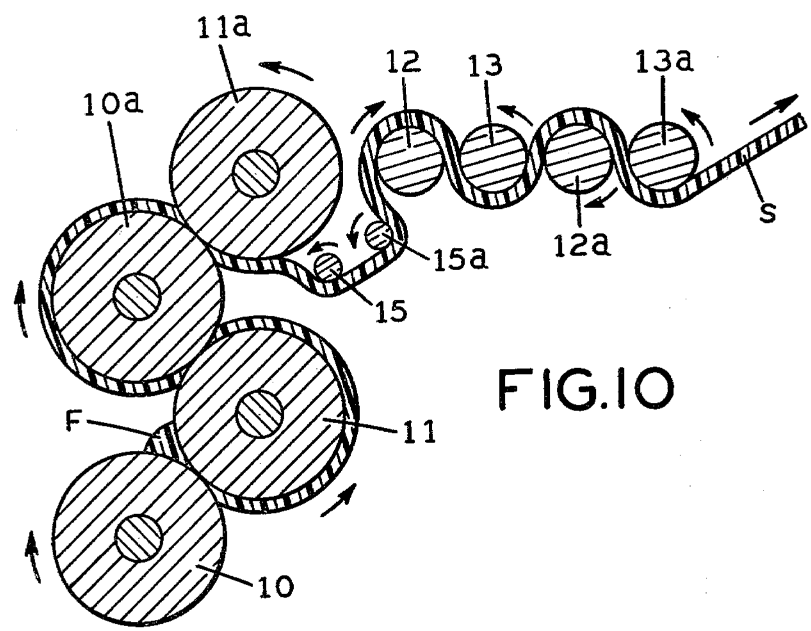
FIG. 10 represents a bottom-fed inclined "Z" calender, with two stripper rolls according to the invention, and the prior art stripper rolls shown in FIG. 9 now serving as conditioning rolls.

The use of two stripper rolls in series, as depicted in FIGS. 5 and 10 gives generally satisfactory results and is one preferred embodiment of the invention; but a single roll can be used if desired, as well as three or more. When two stripper rolls, or three or more, are employed they will usually be run at the same speed.

The stripper roll or rolls of this invention are positioned in such a manner that the sheet being stripped wraps partially around and contacts the roll surface, preferably contacting at least about ¼ of the roll circumference. In this respect the stripper roll of the invention differs significantly from the doffing roll of the prior art which made only tangential or kissing contact with the calendered sheet, and did not exert any substantial influence or control over the stretching of the sheet.

The location of the stripper roll, or of the first stripper roll when two or more are used, with respect to the calender roll and the final nip is not critical and can be varied over a wide range. In general it will be placed as close as possible to the calender roll so that the plastic sheet will lose the minimum amount of width and not be cooled excessively as it traverses the gap between the calender roll and stripper roll. The distance between the first stripper roll and any succeeding stripper roll is also not critical, and can be varied as desired.

Figure 3:
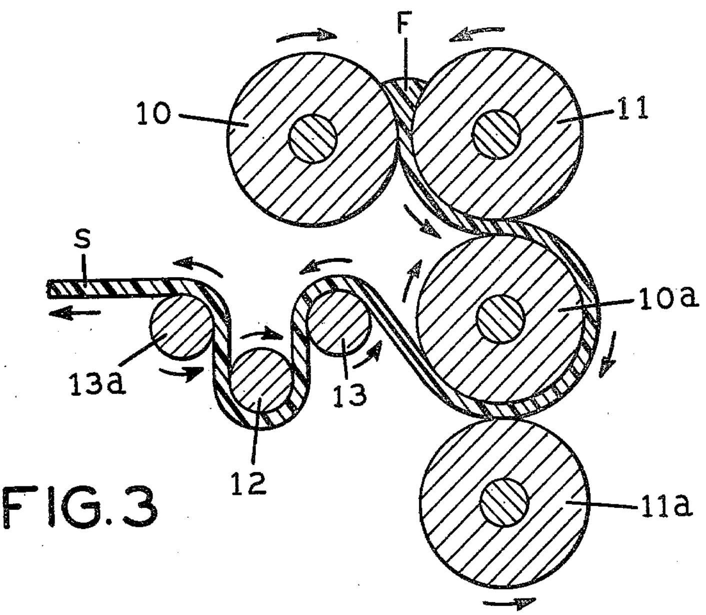
FIG. 3 represents a top-fed "F" calender, with three stripper rolls according to the prior art.
Figure 9:
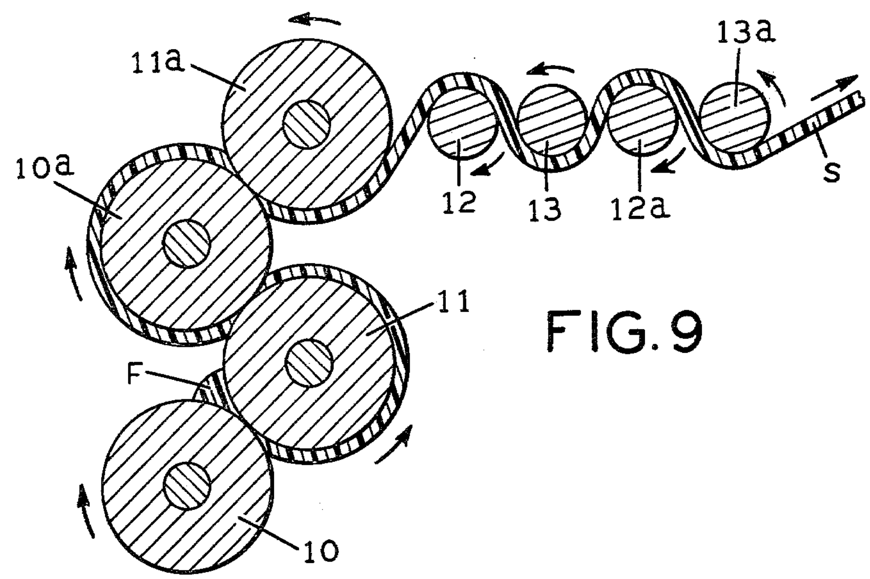
FIG. 9 represents a bottom-fed inclined "Z" calender, with four stripper rolls according to the prior art.

When it is desired to calender a sheet having substantially uniformly side-to-side matte surfaces, it is essential that the stripper roll, or first stripper roll when more than one is used, be positioned as close as possible to the final nip of the calender in order to minimize the distance the sheet travels on the calender roll surface before it is stripped off. Stripping the sheet before it travels more than about ⅛ of the circumference of the calender roll after passing through the final nip represents one particularly preferred embodiment of the invention. Referring to the drawings, apparatus as depicted in FIG. 1, FIG. 3 or FIG. 9 in which the last two calender rolls have a matte surface produces a rigid PVC sheet in which one surface is matte but the other surface is smoother to a perceptible and unsatisfactory degree. When the apparatus is modified as in FIG. 4 or FIG. 6 to include one driven stripper roll, or as in FIG. 10 to include two driven stripper rolls, according to the invention positioned to strip the film close to the nip, the resultant sheet has two matte surfaces of substantially equal roughness.

Figure 4:
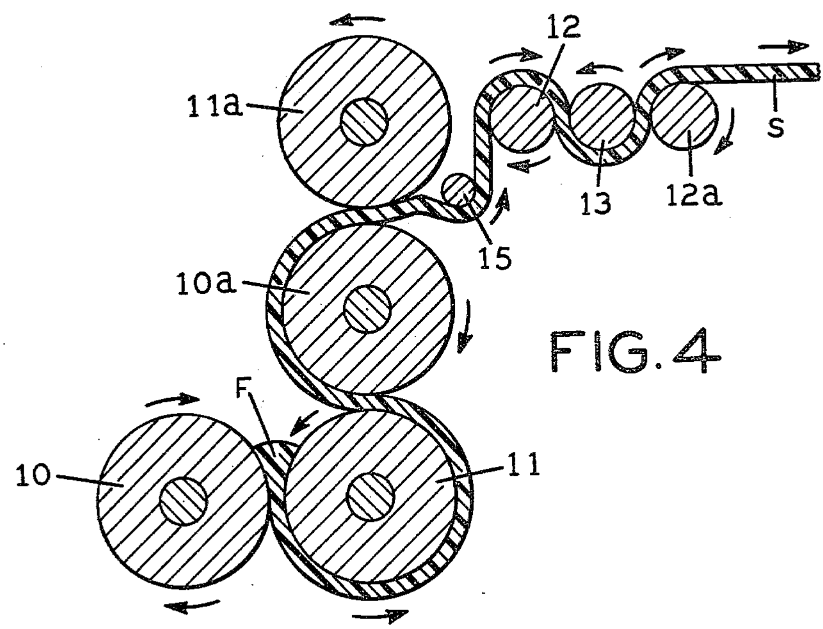
FIG. 4 represents a bottom-fed "L" calender, with one stripper roll according to the invention and with the three prior art stripper rolls shown in FIG. 1 relocated and serving as auxiliary take-off rolls.

The invention will be explained in further detail by reference to certain of the drawings. It will be understood that in all cases the first component of the calendering train is means for fluxing and masticating the compound to be calendered, such means not shown on the drawings, and not forming a part of this invention. Typical means can comprise a batch type intensive mixer such as a Banbury mixer, the discharge from which can be fed to a two-roll mill, or to two two-roll mills the discharge from the first being fed to the second. From the two-roll mill or mills the compound, in the form of strips or rolled up into pigs, is fed either manually or by mechanical conveyor to the bank of the calender, depicted by "F" in the drawings. Other typical means can comprise continuous equipment such as a continuous intensive mixer which can feed a short-barreled extruder, the output of which is then conveyed to the bank of the calender. Obviously, any combination of the preceding fluxing and masticating means can be used, as well as other known means. Referring now to FIG. 1, the fluxed and masticated material in the calender bank F passes through the nip of calender rolls 10 and 11 where it is formed into a sheet or film S. The sheet S then passes around calender roll 11, through the nip of calender rolls 11 and **10*a*, around calender 10*a*, through the nip of calender rolls 10*a* and 11*a*, and is stripped from calender roll 11*a* by the conventional stripper roll 12 which rotates in a direction opposite to that of calender roll 11*a*. From stripper roll 12 sheet S proceeds around stripper rolls 13 and 12*a* and then through the remaining components of the calendering train, not shown in the drawings and not forming a part of the present invention. These components can comprise, for example, conditioning rolls, cooling cans, and a receiving station. The latter can be a windup roll in the case of flexible sheet or film, or a cutting and stacking apparatus for sheet too rigid to be wound on a roll. Referring now to FIG. 4, the same sequence is followed except that the sheet or film S is stripped from calender roll 11*a* by stripper roll 15 rotating in the same direction as calender roll 11*a*. After passing stripper roll 15 sheet S follows a path (optional, and not a necessary feature of the invention) around rolls 12, 13, and 12*a*** now functioning as auxiliary or conditioning rolls rather than as stripper rolls, and then through the remaining components of the calendering train to the receiving station as before.

Figure 2:
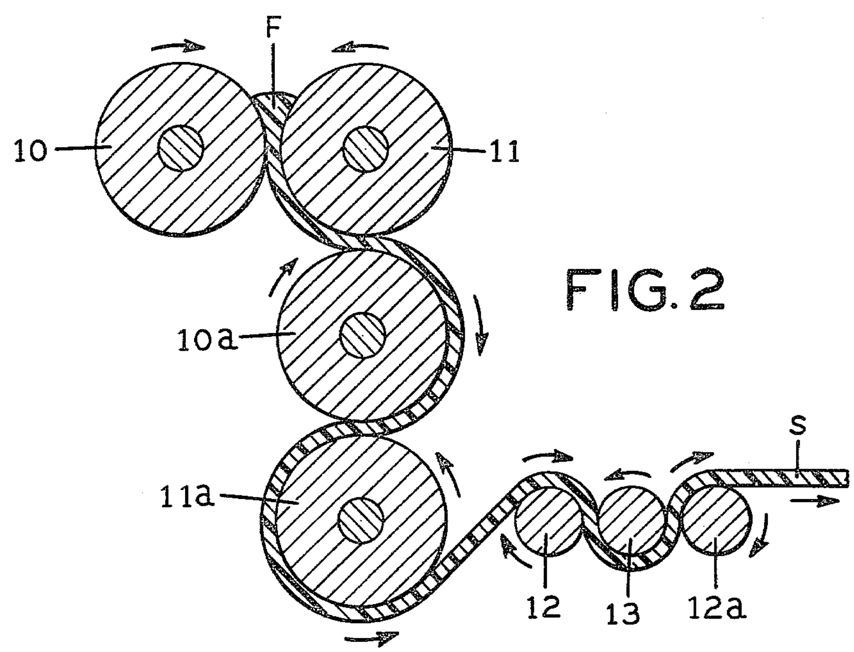
FIG. 2 represents a top-fed inverted "L" calender, with three stripper rolls according to the prior art.

Referring now to FIG. 2, a similar sequence is followed, except that sheet S is stripped from calender roll **11*a* in the conventional manner by a series of three stripper rolls 12, 13, and 12*a*, wherein the first stripper roll 12 rotates in a direction opposite to that of calender roll 11*a*. From the stripper roll assembly 12, 13 and 12*a* sheet S proceeds through the remaining components of the calendering train to the receiving station as before. Referring now to FIG. 5, the same sequence is followed except that sheet S is stripped from calender roll 11*a* by a pair of stripper rolls 15 and 15*a* each rotating at the same speed, and both rotating in the same direction as calender roll 11*a*. After passing stripper rolls 15 and 15*a*, sheet S follows a path (optional), and not a necessary feature of the invention) through rolls 12, 13, and 12*a*** which now function as auxiliary or conditioning rolls rather than as stripper rolls, and then proceeds through the remaining components of the calendering train to the receiving station as before.

Figure 6:
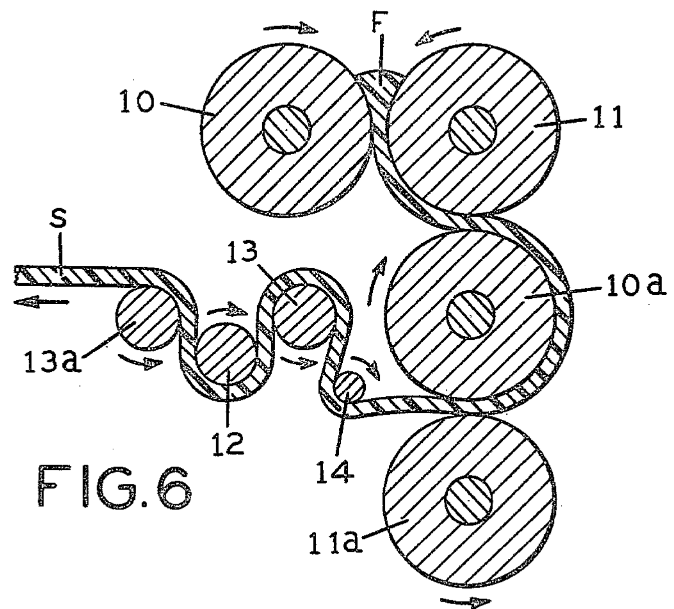
FIG. 6 represents a top-fed "F" calender, with a single stripper roll according to the invention placed between the calender roll and the three prior art stripper rolls shown in FIG. 3, which now serve as auxiliary take-off rolls.

FIG. 3 shows an optional way of using a calender having the same roll configuration as in FIG. 2 wherein sheet S is stripped from the next-to-last calender roll 10a rather than from the last calender roll 11a, and is stripped from calender roll 10a in the conventional manner by a series of three stripper rolls 13, 12, and 13a, wherein the first stripper roll 13 rotates in a direction opposite to that of calender roll 10a. In FIG. 6 the same sequence is followed except that sheet S is stripped from calender roll 10a by stripper roll 14 which rotates in the same direction as calender roll 10a. After passing stripper roll 14 according to the invention, sheet S follows a path (optional, and not a necessary feature of the invention) through rolls 13, 12, and 13a which now function as auxiliary or conditioning rolls rather than as stripper rolls.

Figure 7:
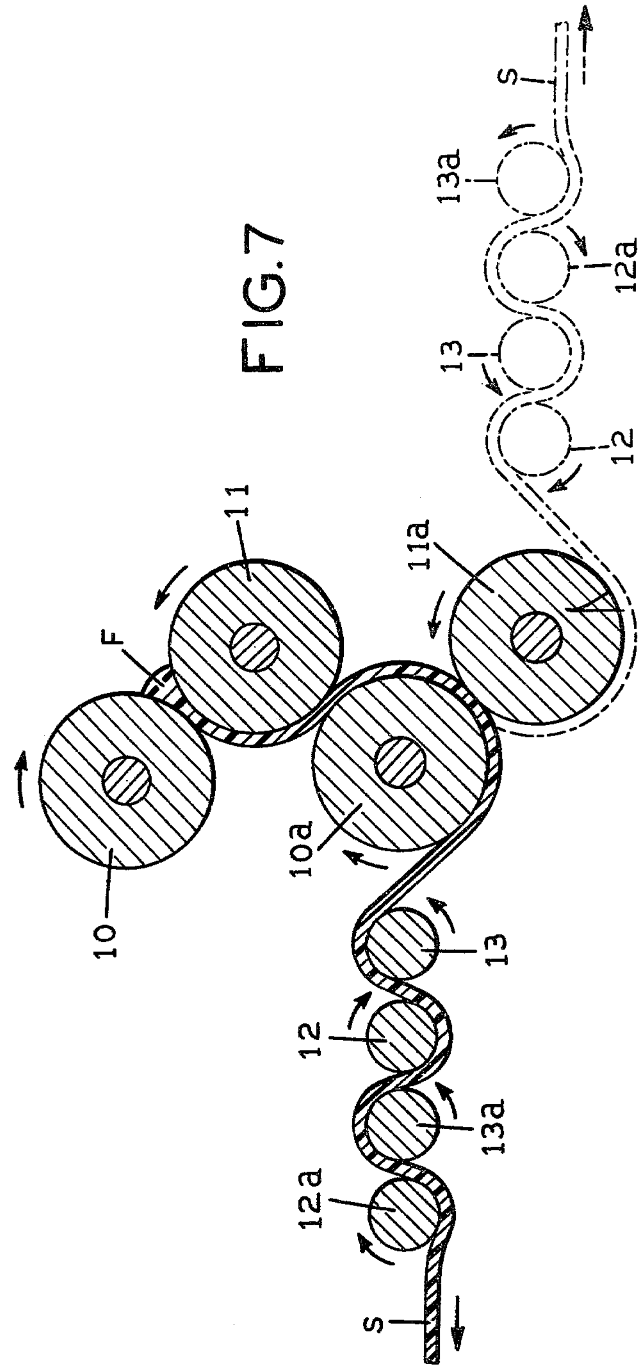
FIG. 7 represents a top-fed "Z" calender, with four stripper rolls according to the prior art. Alternative modes of operation are depicted: the heavy solid line showing a calendered sheet being stripped from the next-to-last calender roll; and the broken lines showing the path of a calendered sheet when stripped from the last calender roll.
Figure 8:
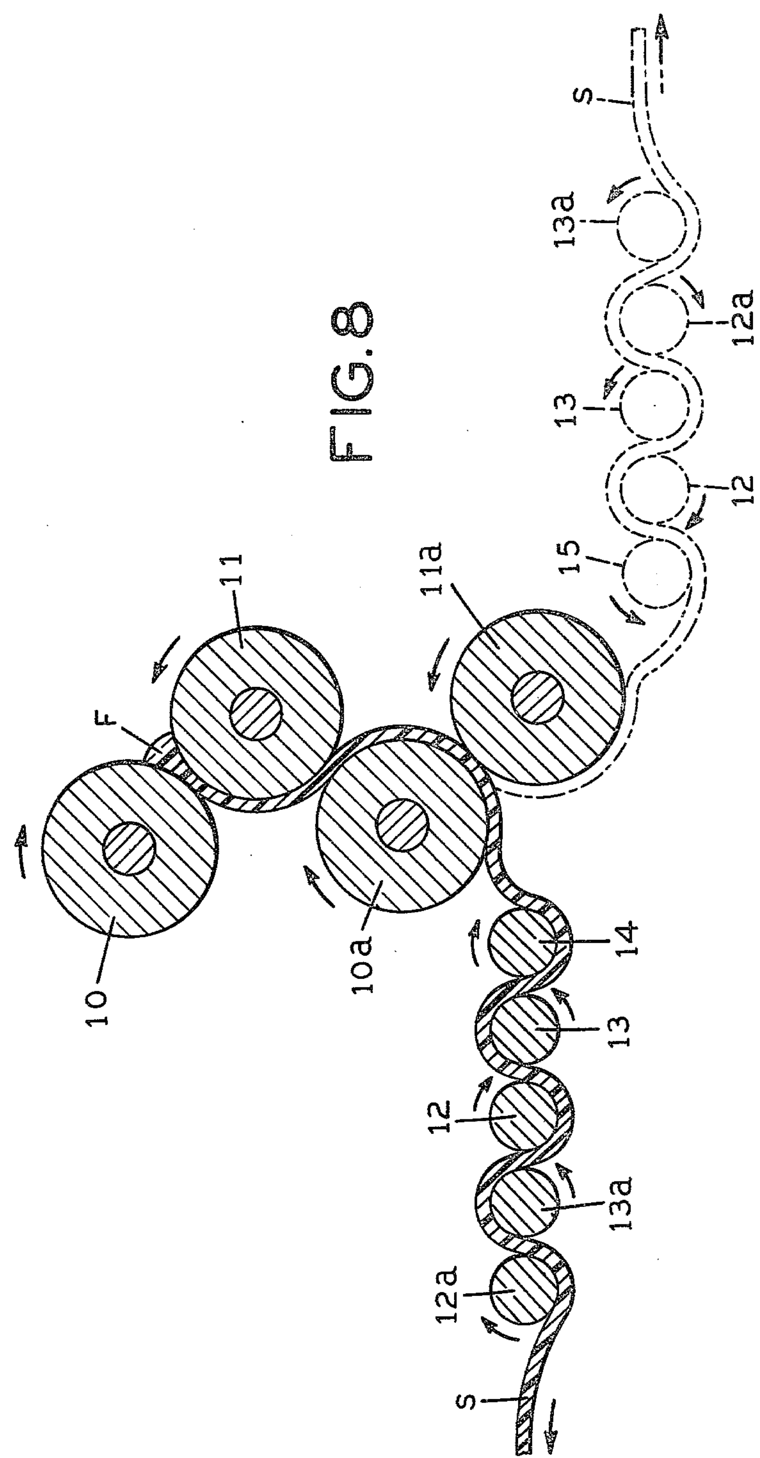
FIG. 8 represents a top-fed "Z" calender, with one stripper roll according to the invention, and the four prior art stripper rolls of FIG. 7 serving as auxiliary rolls. Alternative modes of operation are depicted: the heavy solid line showing a calendered sheet being stripped from the next-to-last calender roll; and the broken lines showing the path of a calendered sheet when stripped from the last calender roll.

It will be apparent that in similar fashion FIG. 7 depicts a "Z" calender with sheet S stripped either from the next-to-last calender roll 10a by conventional stripper rolls 13, 12, 13a, and 12a, or from the last calender roll 11a by conventional stripper rolls 12, 13, 12a, and 13a. In FIG. 8, when sheet S is stripped from calender roll 10a, the conventional stripper rolls have been replaced by stripper roll 14 according to the invention, rotating in the same direction as calender roll 10a. In the alternative method shown in FIG. 8, sheet S is stripped from the last calender roll 11a by stripper roll 15 according to the invention, rotating in the same direction as calender roll 11a. The sheet then passes through the rolls 13, 12, 13c, and 12a, or 12, 13, 12a, and 13a, now serving as conditioning rolls.

Referring now to FIG. 9, sheet S is stripped from the last roll 11a of an inclined "Z" calender by prior art stripper roll 12 rotating in a direction opposite to that of calender roll 11a and then passes around rolls 13, 12a, and 13a. It will be understood that sheet S then proceeds through the remaining components of the calendering train to a receiving station. In FIG. 10, sheet S is stripped from calender roll 11a along a line lying within the first ½ quadrant of the circumference of calender roll 11a, and closer to the nip of calender rolls 10a and 11a than in the case of FIG. 9, by a pair of stripper rolls 15 and 15a according to the invention. FIG. 10 depicts one preferred embodiment of the invention, particularly useful for making calendered sheet having air side/roll side uniformity of texture. In FIG. 10, sheet S is shown following a path (optional, and not a necessary feature of the invention) around roll 12, 13, 12a, and 13a which now function as auxiliary or conditioning rolls rather than as stripper rolls, after passing stripper rolls 15 and 15a. Stripper rolls 15 and 15a each rotate at the same speed, and rotate in the same direction as calender roll 11a. Finally, sheet S passes through the remaining components of the calendering train to a receiving station.

Using the method and apparatus of this invention as depicted in FIG. 5 for example, the minimum rotational speed of stripper rolls 15 and 15a is such that the sheet moves at the same linear speed as it was moving on the surface of calender roll 11a before being stripped off. This will ensure that no excess tension is applied to the sheet and that it will not be stretched or reduced in thickness. When it is desired to produce a sheet having minimal residual strain this mode of even speed is used, and the same even speed is maintained as the sheet passes through the remaining components of the calendering train. However, if it is desired to deliberately stretch the sheet and reduce its thickness, stripper rolls 15 and 15a are rotated faster so that it is stretched between calender roll 11a and stripper rolls 15 and 15a. Provided that the temperature conditions of calender roll 11a and stripper roll 15 are properly adjusted so that the sheet is in a thermoplastic state, the sheet can be stretched with little or no residual strain imparted, and the output from the calender can be increased. When it is desired to deliberately impart some controlled degree of residual strain, or to orient the sheet, it will be cooled sufficiently immediately on leaving stripper rolls 15 and 15a so that it is no longer in a thermoplastic state but is instead thermoelastic. The speed of the drives subsequent to stripper rolls 15 and 15a will be increased relative to the speed of the stripper rolls, the degree of increase being sufficient to produce the desired degree of strain or orientation without further stretching of the sheet. Thus it is apparent that the stripper rolls of this invention function as a "brake" and effectively prevent the sheet or film from being overdriven due to the higher speeds of subsequent drive mechanisms in the train.

The invention if further illustrated by the following examples, which are not to be taken as limitative thereof.

EXAMPLE 1

A rigid PVC composition suitable for use in an application requiring a very low strain was calendered into a sheet having a thickness of 10 mils using a bottom-fed inclined "Z" calender. It was a requirement that the sheet have a maximum strain of −5% longitudinally. The calender has a roll width of 54 inches and a roll diameter of 22 inches.

In the initial run the calender train was equipped with conventional counter-rotating stripper rolls having diameters of 9 inches and placed as depicted in FIG. 9. With this apparatus, it was found that between 300 and 400 pounds per hour of calendered sheet meeting the strain specification of −5% maximum could be produced.

The calender train was then modified by the addition of two stripper rolls having a diameter of 4 inches and rotating in the same direction as the last roll of the calender, placed as depicted in FIG. 10. The conventional stripper rolls were used as an auxiliary conditioning rolls as in FIG. 10. With this apparatus and using the identical PVC composition, it was found that between 800 and 900 pounds per hour of calendered sheet bettering the 5% strain specification was produced. The sheet had a strain of only −3%.

Residual strain was determined by carefully measuring the length of a strip cut from the calendered sheet, at room temperature, the long dimension of the strip being in the direction of travel through the calender, placing the strip in an oven maintained at 100° C. for 20 minutes, cooling the strip down to room temperature, and again carefully measuring the length. The change in length expressed as a percentage of the original length is taken as the degree of strain, this being expressed as a negative number when there is a decrease in length.

EXAMPLE 2

A rigid PVC composition suitable for use in the fabrication of credit cards was calendered into a sheet having a thickness of 25 mils using a bottom-fed inclined "Z" calender. It was a requirement that the credit cards have information printed on both sides, and as a consequence identical surfaces were required. The calender has a roll width of 54 inches and a roll diameter of 22 inches, and the final two rolls had matte surfaces.

In the initial run the calender train was equipped with conventional counter-rotating stripper rolls having a diameter of 9 inches and placed as depicted in FIG. 9.

For the second run, the calender train was modified by the addition to two stripper rolls having diameters of 4 inches and rotating in the same direction as the last calender roll, placed as depicted in FIG. 10. The stripper rolls were driven at such a speed that the linear speed of the calendered sheet on the last calender roll was approximately the same as when the sheet passed the stripper rolls. The conventional stripper rolls were now used as conditioning rolls as shown in FIG. 10. The same rigid PVC composition was used for the second run, using the apparatus modified in accordance with the present invention.

Samples of the sheet from each run were examined with the naked eye for surface-to-surface uniformity. With the samples from the first run, although both surfaces were free from gloss, the "air side" (the side which was not in contact with the last calender roll surface) appeared to be somewhat smoother than the "roll side". This was confirmed by laboratory tests in which an ink was applied to each side of the sheet in a standardized manner designed to simulate printing. In this test, the air side was found to be very markedly inferior to the roll side in ink receptivity and ink adhesion. The two sides were then examined for roughness of texture by means of a scanning electron microscope, at magnifications of 200X, 500X, and 1000X. In this comparison, especially at the higher magnifications, the difference in texture was very evident: the air side was very noticeably smoother than the roll side.

With the samples from the second run, made according to the invention, both sides appeared to be equal in texture when viewed with the naked eye. This was substantiated by the ink test, wherein the air side and roll side were essentially equal with regard to receptivity and adhesion of the ink. Also, when examined with the scanning electron microscope at magnifications of 200X, 500X, and 1000X the two sides were very similar in roughness of surface.

The following procedure was used for the scanning electron microscope examination. Samples approximately 0.5 by 0.5 inch were cut from the calendered sheet, using separate samples for roll side and air side. Each sample was affixed to an aluminum sample mount and sputter-coated with gold at a thickness of approximately 100 angstroms. The coated sample was then placed in the sample chamber of a Coates and Welter Model 104A field emission scanning electron microscope, evacuated to a pressure of approximately $10^{-6}$ Torr. The sample was positioned in the stage at an angle of approximately 60° off perpendicular to the electron beam, and examined at magnifications ranging from 100X to 1000X using accelerating voltage of from 800 eV to 20 KeV. Photomicrographs were made at magnifications of 200X, 500X, and 1000X.

When subjected to actual printing tests, the calendered sheet from the first run gave acceptable results only on the roll side. The calendered sheet from the second run gave satisfactory results on both the roll side and the air side.

What is claimed is:

1. In a process for the manufacture of a continuous sheet or film of plastic material on a calender having at least two rolls which comprises the steps of:

a. fluxing a plastic composition at an elevated temperature into a soft mass;

b. continuously forming said mass into a flexible sheet or film on a heated calender roll;

c. continuously stripping said sheet or film from said calender roll by contacting said sheet or film with stripping means comprising at least one endless, moving second surface acting cooperatively with, but spaced apart from, said calender roll; and, without subjecting said sheet or film to an additional sheet- or film-forming step at elevated temperature, or to further contact with a roll of said calender;

d. cooling said sheet or film to ambient temperature while conveying it to a receiving station;

the improvement which comprises making rolling contact between said stripping means and the side of said sheet or film which was in contact with said calender roll, whereby a plastic sheet or film having a predetermined degree of residual strain is obtained.

2. The process of claim 1 wherein said stripping means comprises at least one roll having its axis parallel to the axis of, and rotating in the same direction as, said roll of a calender.

3. The process of claim 1 wherein said stripping means comprises two or more rolls, said rolls being spaced apart and having their axes parallel to the axis of, and rotating in the same direction as, said roll of a calender.

4. The process of claims 2 or 3 wherein the linear speed imparted to said sheet or film by said stripping means is the same as the linear speed of said surface of said roll of a calender.

5. The process of claim 2 or 3 wherein the linear speed imparted to said sheet or film by said stripping means is from 1 to about 4 times the linear speed of said surface of said roll of a calender.

6. The process of claim 2 or 3 wherein at least the last two rolls of said calender have a matte finish and wherein said stripping means strips said sheet or film from one of said last two calender rolls along a line parallel to the nip of said last two calender rolls at a distance from said nip no greater than about ⅛ of the circumference of said calender roll, whereby the additional improvement of a sheet or film having substantially the same texture on each side is obtained.

7. The process of claim 2 or 3 wherein said plastic material is a composition comprising a homopolymer, copolymer, or terpolymer of vinyl chloride.

8. In apparatus for the manufacture of a continuous sheet or film of plastic material comprising, in cooperating combination, a calender having at least two rolls; stripping means for removing said sheet or film from said calender after said sheet or film has passed through the final nip of said calender, cooling means, a receiving station for said sheet or film, and conveying means for conveying said sheet or film from said stripping means without making further contact with said calender rolls through said cooling means to said receiving station; the improvement wherein said stripping mean comprises at least one driven roll having its axis parallel to, rotating in the same direction as, and spaced apart from the roll of said calender from which said sheet or film is stripped, said stripping means being positioned to make rolling contact with the side of said sheet or film which was in contact with the calender roll from which it is stripped.

9. The apparatus of claim 8 wherein said stripping means comprises two or more driven rolls, said rolls being spaced apart and having their axes parallel to the axis of, and rotating in the same direction as, the calender roll from which said sheet or film is stripped, and positioned to make rolling contact with the side of said sheet or film which was in contact with the calender roll from which it is stripped.

10. The apparatus of claim 8 or 9 wherein said stripping means rotates at a speed to impart the same linear speed to said sheet or film as the linear speed of the surface of the calender roll from which said sheet or film is stripped.

11. The apparatus of claims 8 or 9 wherein said stripping means rotates at a speed to impart to said sheet or film a linear speed of from 1 to about 4 times the linear speed of the surface of the calender roll from which said sheet or film is stripped.

12. The apparatus of claim 8 wherein said stripping means is provided with heating and cooling means for controlling the temperature thereof.

13. The apparatus of claim 8 wherein said stripping means is positioned to strip said sheet or film from one of the rolls of said calender along a line parallel to the nip of the last two calender rolls at a distance from said nip no greater than about $\frac{1}{8}$th of the circumference of said calender roll.

* * * * *